United States Patent [19]
Johnston

[11] Patent Number: 5,839,874
[45] Date of Patent: Nov. 24, 1998

[54] CASK TRANSPORTER WITH BOTTOM LIFT CAPABILITY

[75] Inventor: Roger L. Johnston, Muskeqo, Wis.

[73] Assignee: J & R Engineering Co., Mukwonago, Wis.

[21] Appl. No.: 646,035

[22] Filed: May 7, 1996

Related U.S. Application Data

[63] Continuation-in-part of Ser. No. 250,378, May 27, 1994.

[51] Int. Cl.⁶ .................................................... B60P 3/00
[52] U.S. Cl. ......................... 414/459; 414/460; 414/495
[58] Field of Search ................................... 414/458, 459, 414/460, 461, 471, 495, 496, 911

[56] References Cited

U.S. PATENT DOCUMENTS

| | | | |
|---|---|---|---|
| 3,381,833 | 5/1968 | Gordan | 414/459 |
| 3,494,492 | 2/1970 | Thiermann | 414/461 |
| 3,750,811 | 8/1973 | Anderson et al. | 414/460 |
| 4,275,982 | 6/1981 | Fisco | 414/460 X |
| 4,295,777 | 10/1981 | Bell et al. | 414/458 |
| 4,372,725 | 2/1983 | Moose et al. | 414/460 |
| 4,712,966 | 12/1987 | Gross | 414/495 X |
| 4,820,110 | 4/1989 | Efird | 414/458 |
| 5,018,930 | 5/1991 | Hardin et al. | 414/458 |

FOREIGN PATENT DOCUMENTS

| | | | |
|---|---|---|---|
| 2030524 | 12/1971 | Germany | 414/458 |

*Primary Examiner*—James W. Keenan
*Attorney, Agent, or Firm*—Ryan, Kromholz & Manion

[57] ABSTRACT

A transporter for raising, transporting and positioning ventilated nuclear waste storage casks includes a U-shaped platform that moves on a pair of independently controllable crawlers. A pair of lower lift beams, dimensioned to extend through the air channels of the cask, are slung below the platform. The rear ends of the lower lift beams can be raised and lowered by means of hydraulic cylinders carried on the platform. The forward ends of the lower lift beams can be raised and lowered by an upper lift beam that extends across the forward end of the platform between two vertically extendable columns. After the forward ends of the lower lift beams are inserted through the cask air channels, they are coupled to the upper lift beam by means of two lift pendants. A restraining strap encircles the cask and is tensioned by means of a hydraulic cylinder in order to keep the cask from swinging relative to the platform.

19 Claims, 3 Drawing Sheets

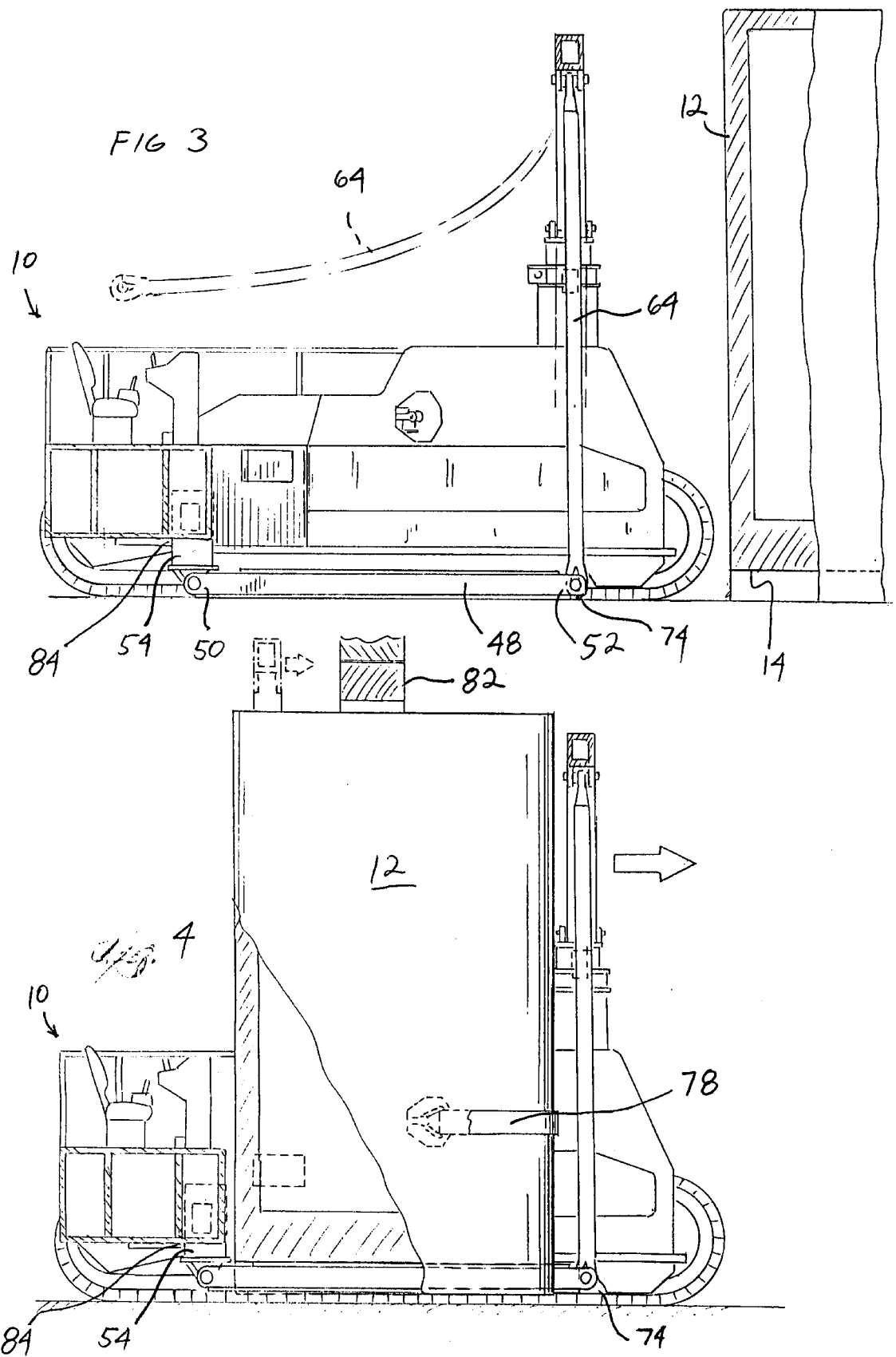

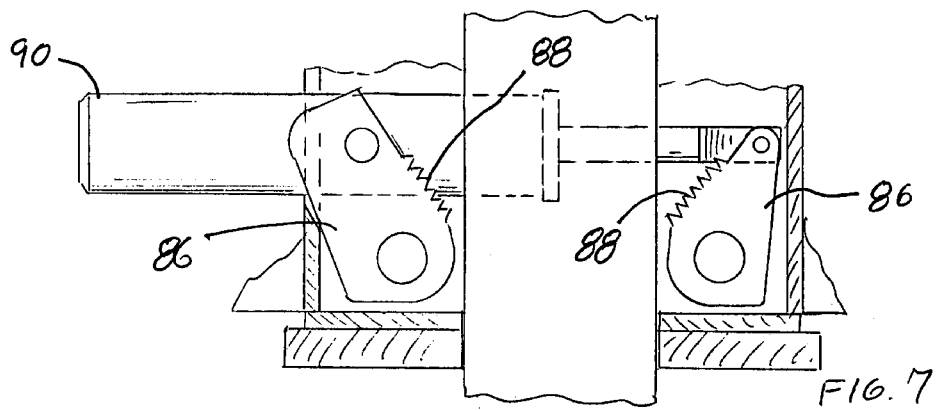
FIG. 7
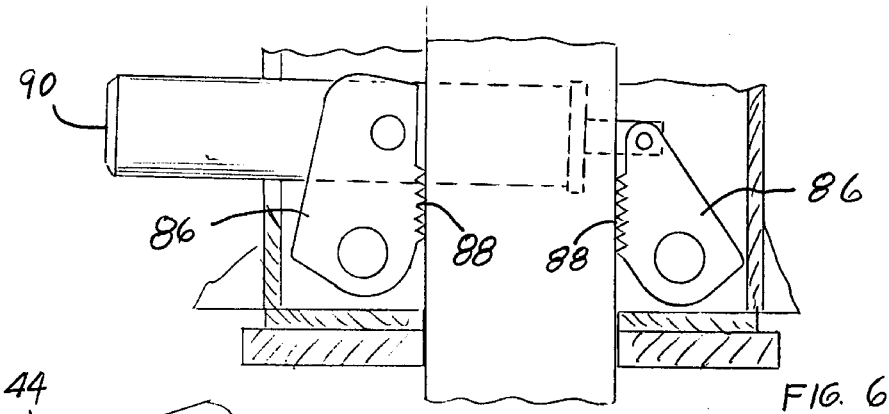
FIG. 6
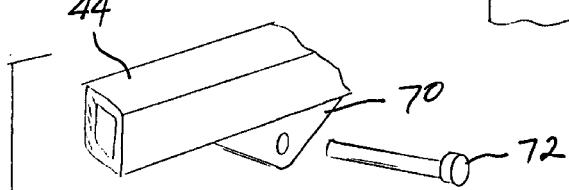
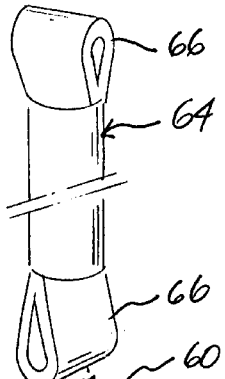
FIG. 5
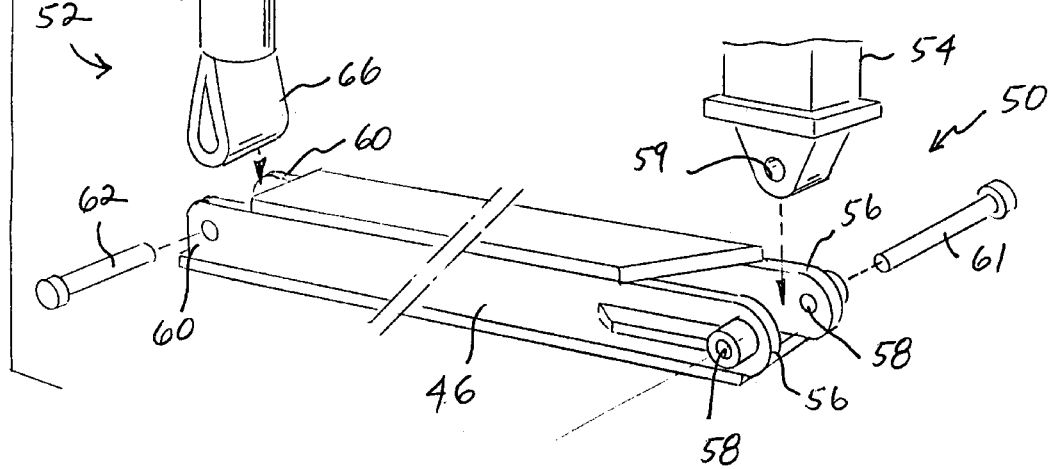

CASK TRANSPORTER WITH BOTTOM LIFT CAPABILITY

RELATED APPLICATION

This is a continuation-in-part of commonly owned, co-pending, U.S. patent application Ser. No. 08/250,378 filed May 27, 1994 entitled "Cask transporter," the specification of which is incorporated by reference herein.

BACKGROUND OF THE INVENTION

This invention relates generally to vehicles for lifting and transporting heavy loads and, more particularly, to vehicles for transporting and positioning nuclear waste storage casks.

The safe long-term storage of nuclear waste is a matter of great concern in the nuclear power industry. In the short term, nuclear waste is frequently stored in specially designed and constructed indoor facilities. Such facilities, however, are filling to capacity. To relieve the burden on indoor storage facilities, large concrete lined waste storage casks have been developed. Such casks, which are designed and built for long-term outdoor storage, have helped relieve the burden on indoor storage facilities.

To be effective and safe, nuclear waste storage casks are generally large, massive and heavy. Such casks are typically 10 feet in diameter, 16 feet high and weigh up to 135 tons. Transporting such casks, particularly when filled with nuclear waste, presents several practical problems. Obviously, such casks need to be handled with extreme precision and care. However, the sheer size and weight of a cask makes it difficult to do this easily. Additionally, the need to move casks into and out of enclosed facilities limits the size and shape of machines that can be used to move the casks. For example, a low ceiling in such a facility makes it impractical to use a boom or overhead crane to lift and transport casks. Similarly, a doorway not much larger than the cask itself limits the extent to which a lifting device can extend beyond the sides, top or bottom of the cask. Given these various constraints, transporters for nuclear waste casks tend to be highly specialized pieces of equipment.

One form of specialized cask transporter is shown and described in the referenced co-pending parent patent application Ser. No. 08/250,378. In that device, each nuclear waste cask being transported was suspended from a horizontal beam positioned over and closely adjacent the cask. The horizontal beam extended only slightly above the cask and thereby permitted cask transport within facilities having limited overhead clearance. Although the horizontal beam extended only slightly above the cask, it nevertheless did project above the cask and thereby added to the overall height of the transported cask. The vertical height of the horizontal beam could, therefore, become problematic in facilities wherein the vertical clearance under doorways was just barely enough to allow passage of waste cask with no additional upwardly projecting structure. Despite the advantages provided by the earlier device, a need still existed in some situations for a transporter that even further reduced the amount of overhead clearance needed to transport a cask.

SUMMARY OF THE INVENTION

The invention provides a transporter for transporting a ventilated storage cask of the type having a pair of substantially parallel air channels. The transporter includes a pair of substantially parallel, substantially horizontal beams receivable in the air channels of the ventilated storage cask. Each of the beams includes first and second ends. A first lift mechanism is coupled to the first ends of the beams for raising and lowering the first ends of the beams. A second lift mechanism is operable to lift and lower coordinately with the first lift mechanism. A selectively engageable coupling is provided for coupling the second ends of the beams with the second lift mechanism after the second ends of the beams have been inserted through the air channels of the cask so that the first and second lift mechanisms can simultaneously lift the beams in a substantially horizontal orientation and thereby lift the cask for transport.

The invention also provides a transporter for transporting a ventilated storage cask of the type including two air channels at its lower end. The transporter includes a mobile platform defining an open area for receiving the cask therein, and a pair of bottom lift beams within the open area arranged to extend through the air channels of the cask when the cask is received in the open area. Each of the bottom lift beams includes a near end and a far end. A first lift mechanism on the mobile platform engages the near end of each of the bottom lift beams for controllably raising the near ends of the bottom lift beams. A pair of extendible lift booms extend vertically upwardly from the mobile platform on opposite sides of the open area adjacent the far ends of the lower lift beams. A top lift beam extends substantially horizontally across the upper ends of the extendible lift booms substantially above the far ends of the bottom lift beams. A pair of lift pendants are provided. Each of the lift pendants is connectable at one end to the top lift beam and at the other end to the far end of a bottom lift beam.

The invention also provides a method of transporting a ventilated storage cask of the type having two air channels extending through its lower end. The method comprises the steps of extending an elongate lift beam through each of the air channels, simultaneously raising each of the lift beams to raise the cask off the ground, and simultaneously transporting the lift beams horizontally to transport the raised cask.

It is an object of the present invention to provide a new and improved cask transporter for transporting, maneuvering and positioning nuclear waste casks.

It is a further object of the invention to provide a new and improved cask transporter that minimizes the amount of overhead clearance needed to transport a cask.

It is a further object of the invention to provide a new and improved cask transporter that transports a nuclear waste cask securely, safely and reliably.

It is a further object of the invention to provide a cask transporter that lifts the cask from the bottom rather than suspends the cask from the top.

It is a further object of the invention to provide a cask transporter that is usable with existing casks of conventional design without requiring cask modification.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 3 is a side elevation view, partially in section, of the cask transporter shown approaching a cask to be transported.

FIG. 4 is a side elevation view similar to FIG. 3 showing the cask transporter moving a cask through a doorway of limited overhead clearance.

FIG. 5 is an exploded perspective view of a bottom lift beam showing a method for detachably securing the beam to the transporter.

FIG. 6 is a side view, partially in section, of a cam lock mechanism that is operable to avoid the inadvertent retraction of a boom assembly in the transporter, the cam lock mechanism being shown in a locked condition.

FIG. 7 is a side view similar to FIG. 6 showing the cam lock mechanism in an unlocked or release condition.

DESCRIPTION OF THE PREFERRED EMBODIMENT

Figure 1:
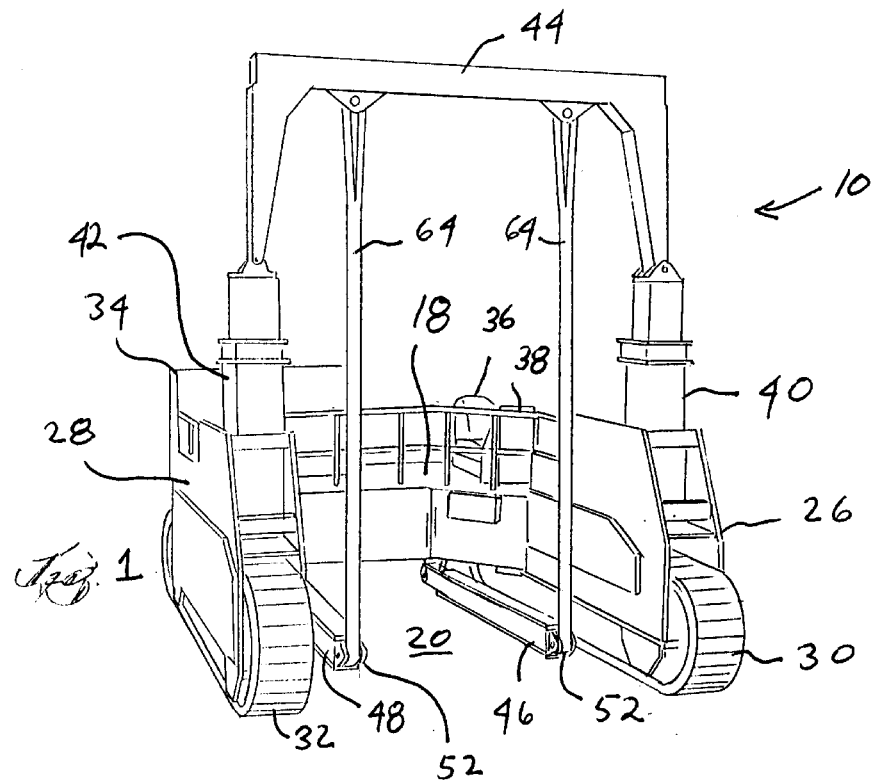
FIG. 1 is a perspective view of a bottom lift cask transporter embodying various features of the invention.
Figure 2:
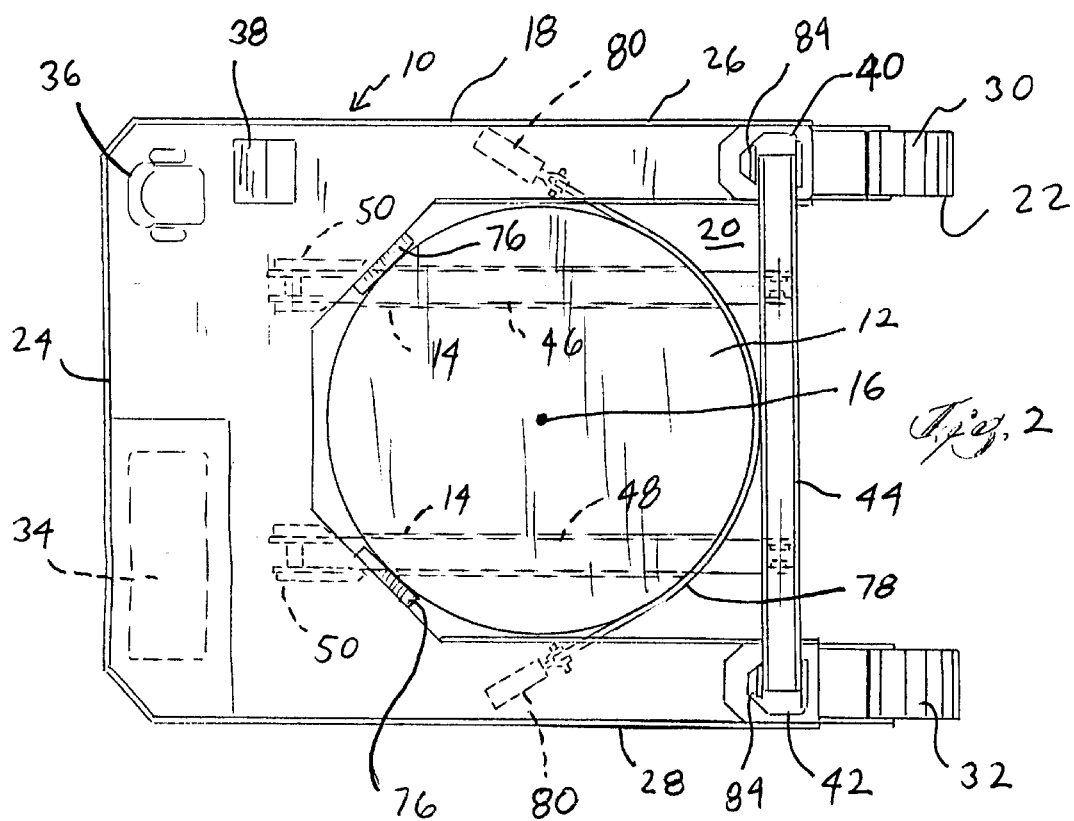
FIG. 2 is a top plan view of the cask transporter shown in FIG. 1 showing a nuclear waste cask secured and retained in the cask transporter.

Referring to the drawings, a bottom lift cask transporter is shown at 10. The transporter 10 comprises a self propelled vehicle that is operable to raise, transport and position ventilated nuclear waste storage casks 12. As illustrated, each cask comprises a vertically oriented, generally cylindrical structure of considerable height, diameter and weight. Each cask 12 includes a pair of horizontal, rectangularly sectioned air channels 14 extending through its lower end. The air channels 14 are parallel to each other and equidistantly spaced from the central axis 16 (FIG. 2) of the cask 12.

The transporter 10 is configured to engage and lift the cask 12 from the bottom using the air channels 14. This is in contrast to the transporter shown in the related co-pending parent application, Ser. No. 08/250,378 wherein the casks are suspended from the top during transport.

The transporter 10 includes a generally U-shaped platform 18 defining an open area 20. The platform 18 includes an open forward end 22 and a closed rear end 24 extending between two, parallel, left and right side members 26, 28. The left and right side members 26, 28, in turn, are supported on left and right crawlers 30, 32 that propel the transporter 10 over the ground. Power for propelling the transporter is provided by a diesel engine 34. An operator's chair 36 and control console 38 are provided for controlling transporter operation. Suitable controls on the console 38 are provided for individually controlling the speed and direction of each crawler 30, 32. This enables the operator to steer and otherwise control movement of the transporter 10.

A pair of vertically extendible front lift booms 40, 42 are provided at the forward ends of the left and right side members 26, 28 on opposite sides of the open area 20. A top lift beam 44 extends across the upper ends of the front lift booms 40, 42. The front lift booms 40, 42 are located so that the top lift beam 44 is forward of the cask 12 when the cask 12 is fully received in the open area 20.

Each of the front lift booms is preferably of square or rectangular cross-section and includes two or more telescoping section. A hydraulic cylinder (not shown) within each boom 40, 42 functions to raise and lower each boom relative to the platform. This has the effect of raising and lowering the top lift beam 44 as well. Suitable individual control levers are preferably provided on the control console 38 to enable the operator to raise and lower the left and right front lift booms 40,42 independently of each other. It will be appreciated that, ordinarily, the left and right lift booms 40, 42 will be raised and lowered coordinately with each other so as to keep the top lift beam 44 substantially horizontal.

To engage the cask 12 for transport, the transporter 10 includes a pair of bottom lift beams 46, 48. Each of the bottom lift beams 46, 48 is shaped and dimensioned to be insertable through the air channels 14 of the cask 12. In the illustrated embodiment, each bottom lift beam 46, 48 comprises an elongate, rigid member of substantially square or rectangular section having sufficient length to project fully through the cask with a portion of each beam 46, 48 projecting beyond the cask at each end. Preferably, each bottom lift beam 46, 48 comprises a steel weldment of hollow box construction that is rigid and strong, yet relatively light.

Each of the bottom lift beams 46, 48 is adapted for detachable connection to the remainder of the transporter 10. To this end, each bottom lift beam 46, 48 includes a rear mount 50 and a forward mount 52. The rear mounts 50 permit detachable connection of the rear ends of the bottom lift beams 46, 48 to a first lift mechanism carried on the lift platform 18. In the illustrated embodiment, the first lift mechanism comprises a pair of vertically oriented, hydraulically actuated, rear lift booms 54 (FIGS. 3,4) that extend downwardly from the mobile platform 18. A hydraulic cylinder (not shown) within each rear lift boom 54 raises and lowers each rear lift boom 54 relative to the platform 18. Each rear mount 50 includes a pair of opposed, spaced flanges 56 (FIG. 5) having coaxially aligned bores 58 formed therein. The bores 58 are alignable with complementary bores 59 formed in the lower ends of the rear lift booms 54, and a beam pin 61 is insertable through the aligned bores to secure the rear ends of the bottom lift beams 46, 48 to the rear lift booms 54.

Similarly, the forward mounts 52 each permit detachable coupling of the forward ends of the bottom lift beams 46, 48 to a second lift mechanism that is operable to lift and lower coordinately with the first lift mechanism. In the illustrated embodiment, the second lift mechanism comprises the top lift beam 44 and the extendible booms 40, 42. Each forward mount 52 includes a pair of opposed flanges 60 supporting a removable pin 62. The forward mounts 52 are coupled to the top lift beam by means of a pair of lift pendants 64 that preferably comprise elongate, flexible straps or round slings formed of Nylon or other such strong, durable polyester. Each end of the lift pendant 64 includes a loop 66, 68 (FIG.5). The lower end of each pendant 64 is "pinned" to the forward mount 52 by means of the removable pin 62 inserted through the loop 66. The upper end of each pendant is similarly connected to the top lift beam 44 by means of a similar pin structure including a pair of flanges 70 and removable pin 72 engaging the upper loop 68.

The forward end of each bottom lift beam 46, 48 is also provided, on its underside, with a roller or other mechanism 74 that enables the beam to roll or otherwise move over the ground.

The manner and method by which the transporter 10 is used to transport a cask 12 is best illustrated in FIGS. 3 and 4. First, the bottom lift beams 46 and 48 are positioned within the open area 12 and are pinned at their rear ends to the rear lift booms 54. The lift pendants 64 are not connected at their lower ends to the bottom lift beams 46, 48 at this time although they may, if desired, remain connected at their upper ends to the top lift beam 44 and pulled out of the way as shown in phantom in FIG. 3. The rear lift booms 54 are lowered sufficiently to intermesh the rear mounts 50 with the rear lift booms 54 while the bottom lift beams 46, 48 rest on the ground. The pins 61 are then inserted to connect the rear ends of the bottom lift beams 46, 48 to the rear lift booms 54.

The transporter is next driven forwardly toward the cask 12 so that the cask can be received in the open area 20. The rollers 74 under the bottom lift beams 46, 48 facilitate movement of the bottom lift beams over the ground as the transporter 10 is maneuvered. The extendible booms 40, 42 are raised sufficiently high to enable the cask 12 to pass under the top lift beam 44. The transporter 10 is also maneuvered so that the forward ends of the bottom lift beams 46, 48 enter and pass through the cask air channels 14. After the bottom lift beams 46, 48 extend fully through the cask 12, the lower ends of the lift pendants 64 are reconnected to the forward ends of the bottom lift beams 46, 48. The top lift beam 44 can be lowered at this time as necessary to permit reconnection of the lift pendants 64 or to lower the overall height of the transporter/cask combination as will be described below.

After the bottom lift beams 46, 48 have been inserted through the cask air channels 14 and the lift pendants 64 connected to the bottom lift beams, the rear lift booms 54 as well as the extendible booms 40, 42 are coordinately raised to raise both bottom lift beams 46, 48 simultaneously while maintaining their substantially parallel relationship to each other and their substantially horizontal orientation. This has the effect of raising the cask 12 off the ground. Thereafter, the transporter 10 can be driven around to transport the cask where desired.

Preferably, a restraining system is provided to keep the cask 12 from swinging as it is transported. To this end, the transporter is provided with a plurality of load bumpers 76 adjacent the closed end of the open area 12 that are formed of a resilient material, such as rubber, and that contact the side of the cask 12 when it is fully received in the transporter 10. In addition, the transporter 10 includes a restraining strap 78 arranged to encircle the leading portion of the cask 12 opposite the load bumpers 76. The restraining strap 78 is connected at its ends to one or more hydraulic cylinders 80 that pull on the strap 78 to put it under considerable tension. This has the effect of pulling the cask 12 snugly back against the load bumpers to keep the cask 12 from swinging. The cylinders 80 are controlled by suitable control levers on the control console 38.

As best seen in FIG. 4, one advantage of the transporter 10 is that it can be operated so that a cask 12 can be transported under overhead obstacles that are only barely higher than the cask 12 itself. For example, in FIG. 4, the cask 12 is to be transported through a doorway 82 that just barely clears the top of the cask 12. As illustrated, there is insufficient clearance for the fully raised top lift beam 44 (shown in phantom) to pass under the doorway 82. Nevertheless, by dropping the top lift beam 44 below the top of the cask 12 after the cask is received in the open area 12 and then connecting the lift pendants 64, the cask can be transported with the top lift beam 44 below the top of the cask 12. This provides sufficient clearance to enable the cask 12 to be transported through the doorway 82 as shown by the solid lines in FIG. 4.

Preferably, each of the forward and rear lift booms 40, 42 and 54 is equipped with a cam lock mechanism 84 that functions to avoid letting the cask 12 drop in the event hydraulic pressure is lost during a lifting or transporting operation. In the case of the forward lift boom 40, 42, the cam lock mechanism 84 functions to lock the sections of the forward lift booms against retraction if hydraulic pressure is lost. In the case of the rear lift booms 54, the cam lock mechanisms 84 function to prevent the boom sections from extending if hydraulic pressure is lost.

As best seen in FIGS. 6 and 7, each of the cam lock mechanisms 84 includes a pair of cams 86 located on opposite sides of a boom section and arranged to engage the boom section when pivoted in a particular direction. Each cam 86 disengages from the boom section when pivoted in the opposite direction. Preferably, the engaging surfaces 88 of the cams 86 are serrated to provide a better grip on the boom sections. Each cam lock mechanism 84 includes a hydraulically actuated release cylinder 90 that, when actuated and extended, pivots the cams 86 away from the boom section.

Ordinarily, the release cylinder 90 of each cam lock mechanism 84 is not actuated, and the cams 86 assume the position shown in FIG. 6. In this position, the engaging surfaces 88 rest against the adjacent boom section. As long as the boom sections are traveling in the proper direction (i.e. extending in the case of the forward booms 40, 42 and retracting in the case of the rear booms 54) the cams 86 permit such movement. In the event hydraulic pressure is lost, however, thereby allowing the weight of a raised cask 12 to force the boom sections in the opposite direction, the resulting movement pivots the cams 86 to bear hard against the boom sections and thereby halt further movement. This helps prevent the cask 12 from crashing down if hydraulic pressure is lost. When the cask is to be lowered intentionally and under control, however, the release cylinders 90 are actuated to pivot the cams 86 away from the boom sections and thereby allow the boom sections to lower the cask. This requires, of course, that hydraulic pressure be available both for lowering the cask under control and for actuating the release cylinders 90. Accordingly, a complete loss of hydraulic pressure will preclude operation of the release cylinders 90 and will prevent the booms from dropping the cask 12.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A transporter for transporting a ventilated storage cask of the type having a pair of substantially parallel air channels, comprising:

a pair of substantially parallel, substantially horizontal beams receivable in the air channels of the ventilated storage cask, each of the beams having first and second ends;

a first lift mechanism coupled to the first ends of the beams for raising and lowering the first ends of the beams;

a second lift mechanism coupled to the first lift mechanism and operable to lift and lower in the same direction, at substantially the same time and at substantially the same rate as the first lift mechanism; and a selectively engageable coupling for coupling the second ends of the beams with the second lift mechanism after the second ends of the beams have been inserted through the air channels of the cask so that the first and second lift mechanisms can simultaneously lift the beams in a substantially horizontal orientation and thereby lift the cask for transport.

2. A transporter as defined in claim 1 further comprising a mobile platform for supporting and transporting the first and second lift mechanisms and the beams coupled thereto.

3. A transporter as defined in claim 2 wherein the beams can be raised from and lowered to a position wherein each beam substantially rests on the ground.

4. A transporter as defined in claim 3 wherein each beam includes an underside adapted for horizontal movement over the ground.

5. A transporter as defined in claim 4 wherein the underside of each beam includes one or more rotary elements.

6. A transporter as defined in claim 2 wherein the first lifting mechanism includes a pair of lifting devices individually coupled to the first ends of the beams.

7. A transporter as defined in claim 6 wherein the lifting devices coupled to the first ends of the beams comprise hydraulic cylinders mounted on the mobile platform.

8. A transporter as defined in claim 2 wherein the second lifting mechanism includes a substantially horizontal top lift beam raisable and lowerable relative to the mobile platform.

9. A transporter as defined in claim 8 further comprising a pair of extendible vertical columns for supporting the top lift beam.

10. A transporter as defined in claim 9 wherein the selectively engageable coupling interconnects the second end of each beam with the top lift beam.

11. A transporter as defined in claim 10 wherein the selectively engageable coupling includes a pair of straps extending between the top lift beam and the second ends of the beams.

12. A transporter for transporting a ventilated storage cask of the type including two air channels at its lower end, comprising:

a mobile platform defining an open area for receiving the cask therein;

a pair of bottom lift beams within the open area arranged to extend through the air channels of the cask when the cask is received in the open area, each of the bottom lift beams including a near end and a far end;

a first lift mechanism on the mobile platform engaging the near end of each of the bottom lift beams for controllably raising the near ends of the bottom lift beams;

a pair of extendible lift booms extending vertically upwardly from the mobile platform on opposite sides of the open area adjacent the far ends of the lower lift beams;

a top lift beam extending substantially horizontally across the upper ends of the extendible lift booms substantially above the far ends of the bottom lift beams; and a pair of lift pendants, each of the lift pendants being connectable at one end to the top lift beam and at the other end to the far end of a bottom lift beam.

13. A transporter as defined in claim 12 wherein the mobile platform is of generally U-shaped configuration and the top lift beam extends across the open ends of the mobile platform.

14. A transporter as defined in claim 13 wherein the mobile platform moves on a pair of crawlers.

15. A transporter as defined in claim 14 wherein the first lift mechanism includes a pair of hydraulic cylinders individually connected to the near ends of the bottom lift beams.

16. A transporter as defined in claim 12 further comprising a restraint for securing the cask within the open area to restrain swinging movement of the cask relative to the mobile platform.

17. A transporter as defined in claim 16 wherein the restraint includes a strap adapted to encircle at least a portion of the cask.

18. A transporter as defined in claim 17 wherein the restraint includes a tensioning mechanism for tensioning the strap around the cask.

19. A transporter as defined in claim 18 wherein the tensioning mechanism includes a hydraulic cylinder operable to tension the strap.

* * * * *